US012559297B2

(12) United States Patent
Xu et al.

(10) Patent No.: US 12,559,297 B2
(45) Date of Patent: Feb. 24, 2026

(54) GARBAGE BAG STORAGE DEVICE THAT FACILITATES TEARING OPEN GARBAGE BAG

(71) Applicant: KIND PET PRODUCTS CO., LTD, Zhongshan (CN)

(72) Inventors: Yusheng Xu, Zhongshan (CN); Tianle Yang, Zhongshan (CN); Yibao Zeng, Zhongshan (CN)

(73) Assignee: KIND PET PRODUCTS CO., LTD, Zhongshan (CN)

( * ) Notice: Subject to any disclaimer, the term of this patent is extended or adjusted under 35 U.S.C. 154(b) by 0 days.

(21) Appl. No.: 18/766,100

(22) Filed: Jul. 8, 2024

(65) Prior Publication Data

US 2025/0250100 A1 Aug. 7, 2025

(30) Foreign Application Priority Data

Feb. 6, 2024 (CN) ......................... 202420286851.6

(51) Int. Cl.
*B65D 83/08* (2006.01)
*B65F 1/00* (2006.01)

(52) U.S. Cl.
CPC ........ *B65D 83/0811* (2013.01); *B65F 1/0006* (2013.01); *B65F 2240/136* (2013.01)

(58) Field of Classification Search
CPC ................ A01K 23/005; A01K 27/008; B65F 2240/136; B65D 83/0835; B65D 83/0841; A47F 2009/004
See application file for complete search history.

(56) References Cited

U.S. PATENT DOCUMENTS 765,221 A * 7/1904 Arents ............... B65H 35/0026 225/53
5,024,349 A * 6/1991 Haenni ................. A47F 13/085 221/281
5,135,134 A * 8/1992 Dancy .................... B65H 35/10 225/41
5,630,563 A * 5/1997 Meisner ............... B65H 35/002 242/598.6
6,240,881 B1 * 6/2001 Edwards .............. A01K 27/006 119/795

(Continued)

FOREIGN PATENT DOCUMENTS

CN 210116784 U 2/2020

*Primary Examiner* — Mollie Impink
(74) *Attorney, Agent, or Firm* — Westbridge IP LLC

(57) ABSTRACT

Disclosed is a garbage bag storage device that facilitates tearing open a garbage bag, which includes a storage device body; a storage cavity is arranged in the storage device body for storing a garbage bag, and a side opening is arranged on a side portion of the storage device body for extracting the garbage bag; and a first pressing portion is further arranged on the side portion of the storage device body, and when the first pressing portion is pressed, it is capable of moving toward the side portion of the storage device body to compress the garbage bag. After pulling out the full length of the garbage bag, use one hand to press the first pressing portion toward the side portion of the storage device body, thereby compressing the garbage bag. At this point, the other hand can grasp the garbage bag and easily and quickly tear it open.

8 Claims, 6 Drawing Sheets

(56) References Cited

U.S. PATENT DOCUMENTS

| | | | | |
|---|---|---|---|---|
| 8,312,599 B2 * | 11/2012 | Vogl | A01K 27/006 | 24/3.12 |
| 8,714,428 B2 * | 5/2014 | Mallard | B65D 83/0841 | 225/77 |
| 8,967,440 B2 * | 3/2015 | Chang | B65H 35/002 | 225/2 |
| 11,564,410 B2 * | 1/2023 | Martin | A24C 5/52 | |

* cited by examiner

GARBAGE BAG STORAGE DEVICE THAT FACILITATES TEARING OPEN GARBAGE BAG

CROSS-REFERENCE TO RELATED APPLICATIONS

This application claims priority to Chinese Patent Application No. 202420286851.6, filed on Feb. 6, 2024, the content of which is incorporated herein by reference in its entirety.

TECHNICAL FIELD

The present disclosure herein relates to the technical field of pet products, and in particular to a garbage bag storage device that facilitates tearing open a garbage bag.

BACKGROUND

With the continuous improvement of people's living standards, people are constantly pursuing spiritual life while enjoying material life. Keeping pets has become a popular way for people to pursue spiritual life. One of the problems you must face when raising pets is the need to dispose of pet excrement when walking your pets outdoors or taking your pets out to play. Therefore, many users carry a pet garbage bag box with them. When they need to dispose of pet excrement, they pull out the garbage bag from the pet garbage bag box, pick up the pet excrement, and then throw it away when they reach the garbage bin. However, the garbage bags stored in pet garbage bag boxes are generally roll-shaped and equipped with tear lines. When tearing open a garbage bag, it is usually necessary to use both hands to grasp the bag, which means that users have to either use other parts of their body to hold the pet garbage bag box steady or place the box on the floor or another surface, in order to free up both hands. This operation can be cumbersome and inconvenient for users.

SUMMARY

In order to overcome the shortcomings of the prior art, the purpose of the present disclosure is to provide a garbage bag storage device that facilitates tearing open a garbage bag, which is convenient for users and improves the user experience.

In order to solve the above problems, the technical solution adopted by the present disclosure is as follows: a garbage bag storage device that facilitates tearing open a garbage bag, including a storage device body; a storage cavity is arranged in the storage device body for storing a garbage bag, and a side opening is arranged on a side portion of the storage device body for extracting the garbage bag; and a first pressing portion is further arranged on the side portion of the storage device body, and when the first pressing portion is pressed, it is capable of moving toward the side portion of the storage device body to compress the garbage bag.

Compared with the existing technology, the beneficial effect of the present disclosure is that when in use, place the rolled garbage bag into the storage cavity, hold the storage device body with one hand, and pull out the garbage bag from the side opening with the other hand. After pulling out the full length of the garbage bag, use one hand to press the first pressing portion toward the side portion of the storage device body, thereby compressing the garbage bag. At this point, the other hand can grasp the garbage bag and easily and quickly tear it open, which can avoid the difficulty of fixing the storage device body when both hands are needed to grasp the garbage bag, making it convenient for users and improving usability.

In the above-mentioned garbage bag storage device that facilitates tearing open the garbage bag, the storage device body includes a first side wall and a second side wall that are connected to each other, and a gap is arranged between the first side wall and the second side wall to form the side opening.

In the above-mentioned garbage bag storage device that facilitates tearing open the garbage bag, the first pressing portion is arranged on the first side wall, and an opening groove is arranged between a top portion of the first side wall and a top portion of the storage device body, as well as between a bottom portion of the first side wall and a bottom wall of the storage device body, to enable the first side wall to undergo elastic deformation, so that the first pressing portion is capable of pressing the garbage bag towards the second side wall.

In the above-mentioned garbage bag storage device that facilitates tearing open the garbage bag, a bottom portion of the storage device body is provided with a sealing structure, and the sealing structure is used for sealing the garbage bag and clamping it to the bottom portion of the storage device body.

In the above-mentioned garbage bag storage device that facilitates tearing open the garbage bag, the sealing structure comprises a sealing clip, a first end of the sealing clip is rotatably connected to the storage device body, a second end of the sealing clip is detachably connected to the storage device body, and the sealing clip is capable of sealing the garbage bag and clamping it to the bottom portion of the storage device body.

In the above-mentioned garbage bag storage device that facilitates tearing open the garbage bag, the bottom portion of the storage device body is provided with a groove and a locking rib, a first end of the groove is provided with a rotating hole, the first end of the sealing clip is provided with a rotating portion, the second end of the sealing clip is provided with a buckle portion, the rotating portion is rotatably connected to the rotating hole, and the buckle portion is buckling connected to the locking rib.

In the above-mentioned garbage bag storage device that facilitates tearing open the garbage bag, the second end of the sealing clip is provided with a second pressing portion, and the second pressing portion is capable of undergoing elastic deformation when pressed, so that the buckle portion is detached from the locking rib.

In the above-mentioned garbage bag storage device that facilitates tearing open the garbage bag, a top cover is detachably connected to the top portion of the storage device body, and a top portion of the top cover is provided with a hanging portion.

In the above-mentioned garbage bag storage device that facilitates tearing open the garbage bag, an outer surface of the first pressing portion is provided with an anti-slip structure.

In the above-mentioned garbage bag storage device that facilitates tearing open the garbage bag, a bottom wall of the storage cavity is provided with a positioning column, and the positioning column is used for positioning and connecting a reel of the garbage bag.

The present disclosure will be further described in detail below in conjunction with the accompanying drawings and specific embodiments.

DETAILED DESCRIPTION OF THE EMBODIMENTS

Figure 1:
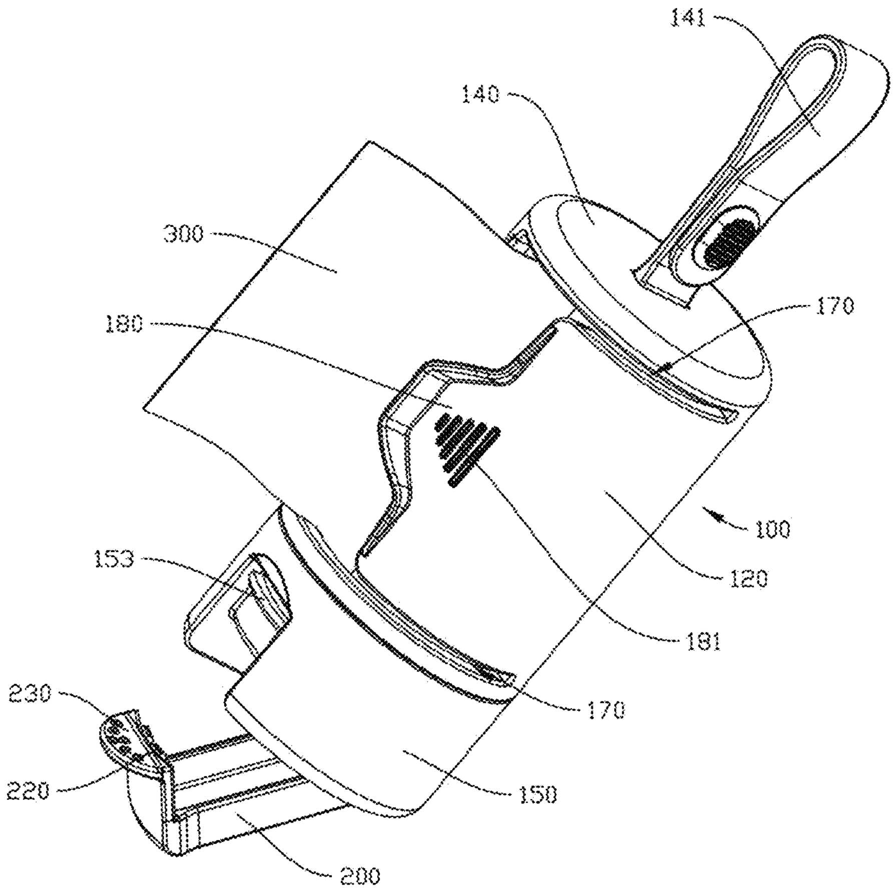
FIG. 1 is a schematic diagram of an overall structure of a garbage bag storage device according to an embodiment of the present disclosure.
Figure 2:
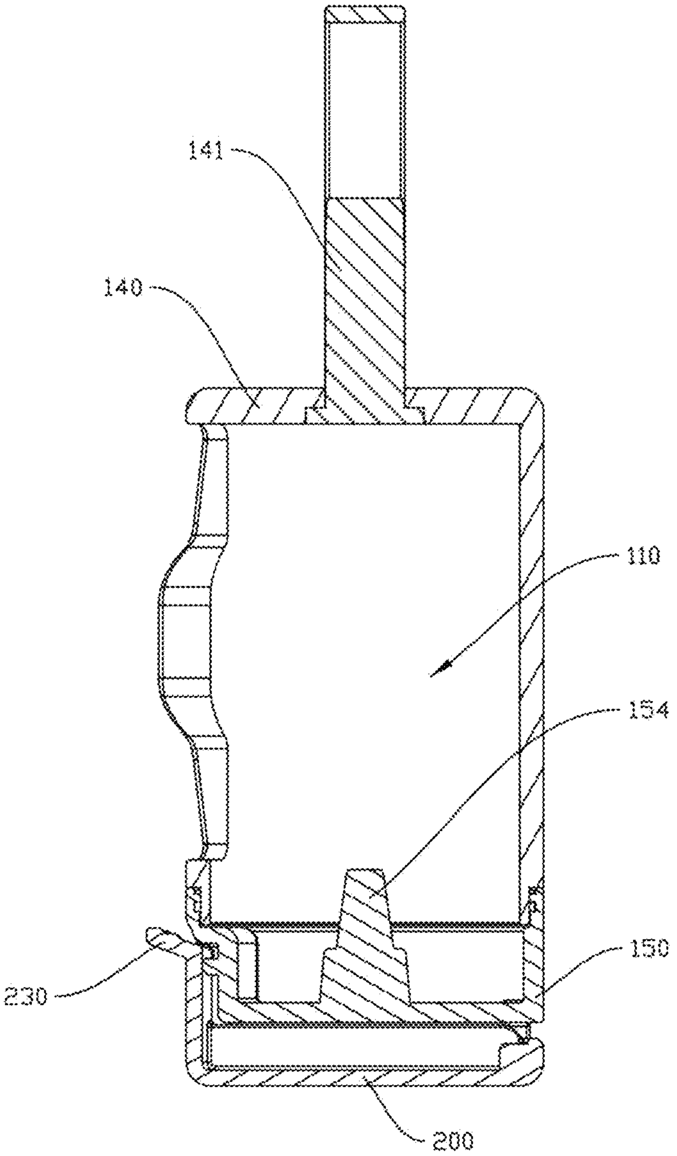
FIG. 2 is a cross-sectional view of a garbage bag storage device according to an embodiment of the present disclosure.
Figure 3:
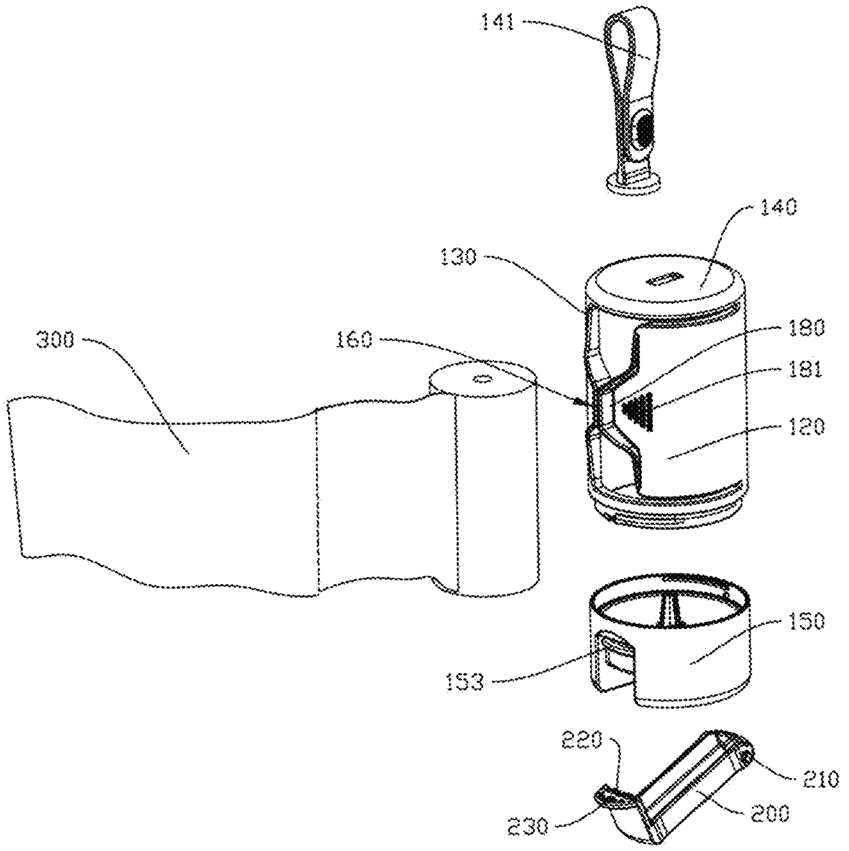
FIG. 3 is an exploded view of a garbage bag storage device according to an embodiment of the present disclosure.

The following is a detailed description of an embodiment of the present disclosure. Referring to FIG. 1, an embodiment of the present disclosure provides a garbage bag storage device that facilitates tearing open a garbage bag, comprising a storage device body 100, the storage device body 100 includes a first side wall 120 and the second side wall 130 that are connected to each other, as well as a bottom cover 150 connected to the bottom portions of the first side wall 120 and the second side wall 130, and a top cover 140 detachably connected to the first side wall 120 and the second side wall 130. Both the top cover 140 and the bottom cover 150 can be fixed to the upper and lower ends of the storage device body 100 by means of threaded connection or snap connection. Referring to FIG. 2, a storage cavity 110 is arranged in the storage device body 100 for storing a garbage bag 300, and the storage cavity 110 is enclosed by the first side wall 120, the second side wall 130, the bottom cover 150 and the top cover 140. As shown in FIG. 3, the garbage bag 300 is a roll-shaped garbage bag 300 with a tear line. Continuing to refer to FIG. 2, a bottom wall of the storage cavity 110 is provided with a positioning column 154, and the positioning column 154 is used for positioning and connecting a reel of the garbage bag 300. Continuing to refer to FIGS. 1 and 3, a side opening 160 is arranged on a side portion of the storage device body 100 for extracting the garbage bag 300. Specifically, a gap is arranged between the first side wall 120 and the second side wall 130 to form the side opening 160. When storing the garbage bag 300, the top cover 140 is opened, the roll-shaped garbage bag 300 is placed into the storage cavity 110 through the upper portion of the storage cavity 110, the reel of the garbage bag 300 is then sleeved onto the positioning column 154, the free end of the garbage bag 300 is pulled out to the side opening 160, and finally, the top cover 140 is closed. When the garbage bag 300 is pulled out, the roll-shaped garbage bag 300 can rotate around the positioning column 154, allowing the garbage bag 300 to be pulled out smoothly.

Furthermore, a hanging portion 141 is arranged on the top portion of the top cover 140, which can facilitate the user lifting or hanging the storage device for easy portability or placement. Specifically, the hanging portion 141 can be a hanging hole arranged on the top cover 140, or it can be a hook, or a hanging strap, as shown in FIGS. 1 to 6.

Figure 4:
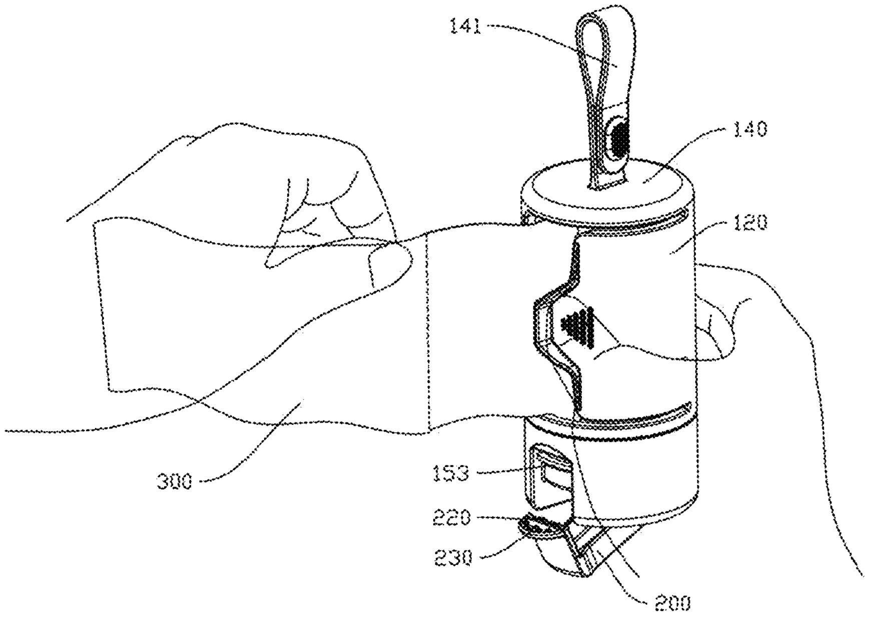
FIG. 4 is a schematic diagram of tearing open a garbage bag according to an embodiment of the present disclosure.

Furthermore, continuing to refer to FIG. 1, a first pressing portion 180 is further arranged on the side portion of the storage device body 100, and when the first pressing portion 180 is pressed, it is capable of moving toward the side portion of the storage device body 100 to compress the garbage bag 300. Referring to FIG. 4, during use, one of the hands holds the storage device body 100, and the other hand pulls out the garbage bag 300 from the side opening 160. After pulling out the full length of the garbage bag 300, one of the hands can press the first pressing portion 180 toward the side portion of the storage device body 100, thereby compressing the garbage bag 300. At this point, the other hand can grasp the garbage bag 300 and easily and quickly tear it open, which can avoid the difficulty of fixing the storage device body 100 when both hands are needed to grasp the garbage bag 300, making it convenient for users and improving usability.

Furthermore, the first pressing portion 180 is arranged on the first side wall 120, and an opening groove 170 is arranged between a top portion of the first side wall 120 and a top portion of the storage device body 100, as well as between a bottom portion of the first side wall 120 and a bottom wall of the storage device body 100, to enable the first side wall 120 to undergo elastic deformation, so that the first pressing portion 180 is capable of pressing the garbage bag 300 towards the second side wall 130. Specifically, the opening groove 170 is arranged between the top portion of the first side wall 120 and the top cover 140, and the opening groove 170 is arranged between the bottom portion of the first side wall 120 and the bottom cover 150. It can be understood that the first side wall 120 and the second side wall 130 both belong to the side walls of the storage device body 100 and are generally formed in one piece, that is, a whole cylinder wall. They are named here as the first side wall 120 and the second side wall 130, which are only used to facilitate the description of the position of the side opening 160 and cannot be regarded as dividing the side walls of the storage device body 100. In some other embodiments, the structure of the second side wall 130 can be configured to be similar to the structure of the first side wall 120, that is, the second side wall 130 can also undergo elastic deformation. When holding the storage device body 100 and applying pressure, the first side wall 120 and the second side wall 130 can clamp each other, thereby clamping the garbage bag 300. Of course, it can be understood that at least one side wall of the first side wall 120 and the second side wall 130 is connected to the top cover 140 and the bottom cover 150, and cannot be separated from the top cover 140 and the bottom cover 150 via the opening groove 170. In addition, the first pressing portion 180 may also be arranged on the second side wall 130. When holding the storage device body 100 and applying pressure, the two first pressing portions 180 can clamp each other, thereby clamping the garbage bag 300. Furthermore, referring to FIGS. 1 and 3, an outer surface of the first pressing portion 180 is provided with an anti-slip structure 181 such as anti-slip textures or anti-slip protrusions, so that the user can press smoothly to deform the first side wall 120.

Figure 5:
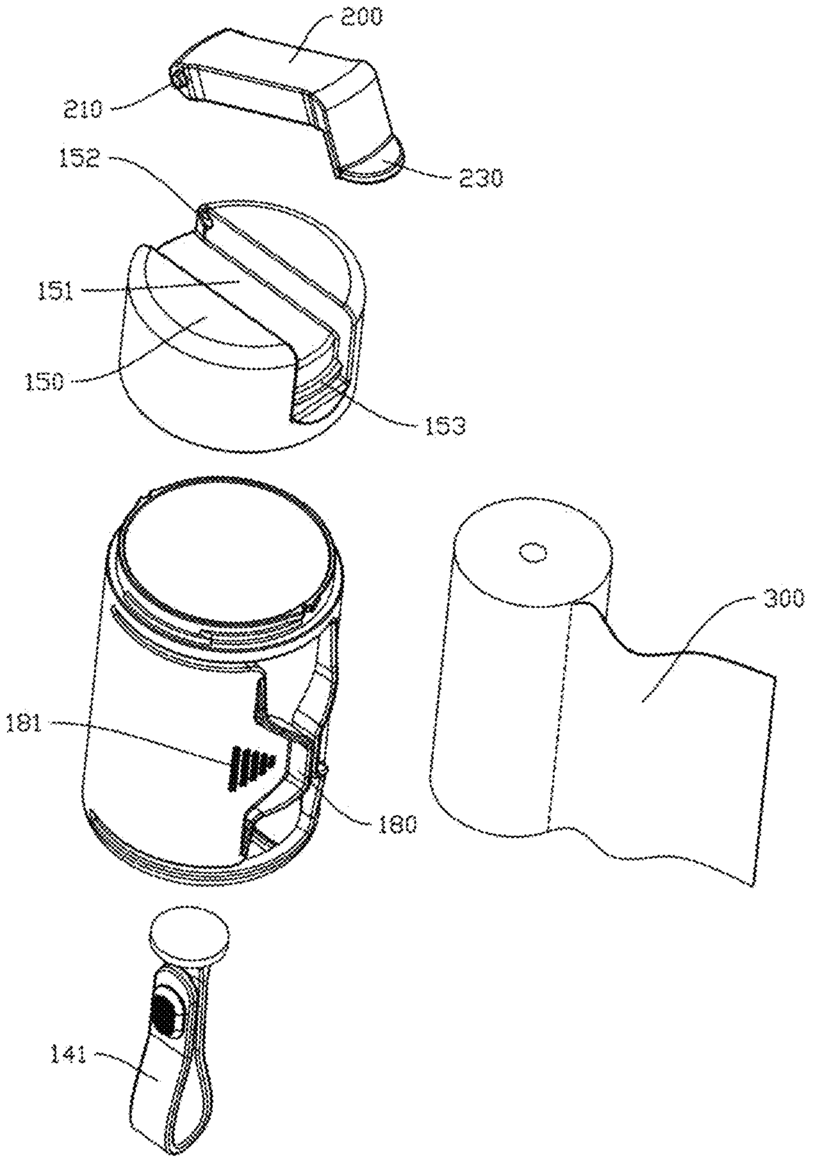
FIG. 5 is an exploded view of a garbage bag storage device when it is inverted according to an embodiment of the present disclosure.
Figure 6:
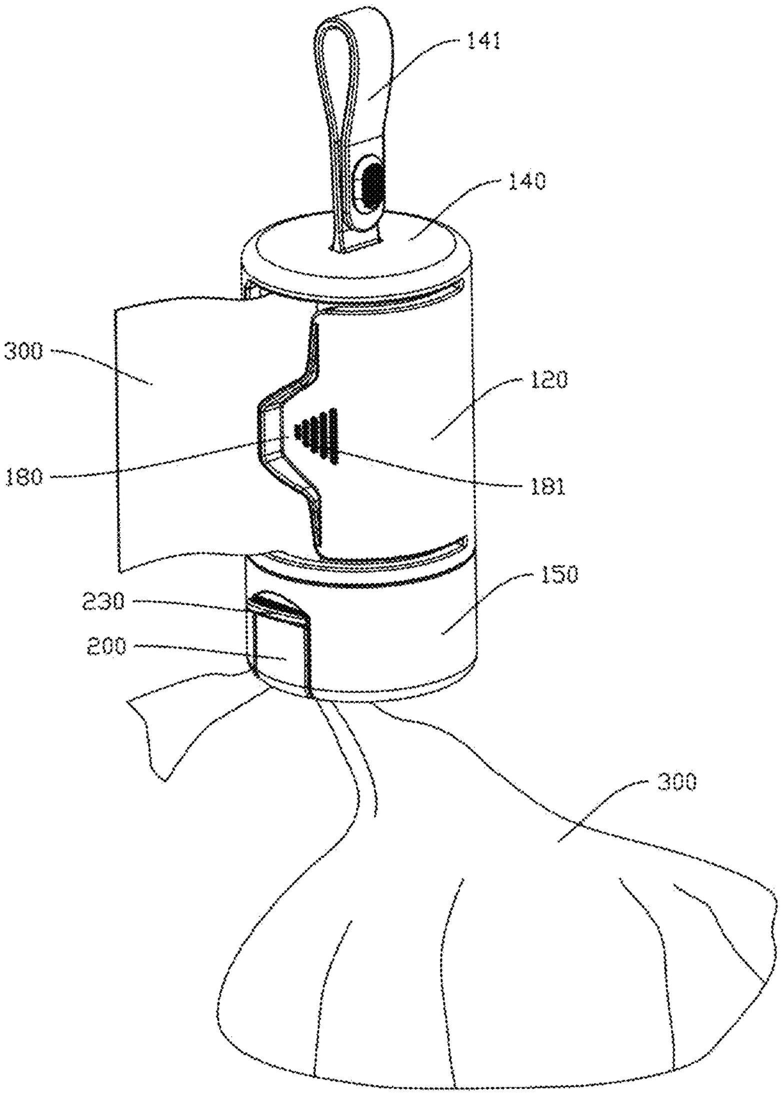
FIG. 6 is a schematic diagram showing a garbage bag storage device during the process of sealing and clamping a garbage bag, according to an embodiment of the present disclosure.

Furthermore, referring to FIGS. 5 and 6, the bottom portion of the storage device body 100 is provided with a sealing structure, and the sealing structure can seal the garbage bag 300 to prevent the smell of pet excrement from dissipating. The sealing structure can also clamp the garbage bag 300 to the bottom portion of the storage device body 100, eliminating the need to carry the garbage bag 300 by hand and making it easy to carry. After reaching the position of the garbage bin, the sealing structure can be unsealed and the garbage can be thrown into the garbage bin. Furthermore, the sealing structure comprises a sealing clip 200, a first end of the sealing clip 200 is rotatably connected to the storage device body 100, and a second end of the sealing clip 200 is detachably connected to the storage device body 100. When in use, the second end of the sealing clip 200 can be detached, the garbage bag 300 can be placed between the sealing clip 200 and the bottom portion of the storage device body 100, and then the sealing clip 200 can be rotated to fix the second end of the sealing clip 200 to the bottom portion of the storage device body 100, thereby sealing and clamping the garbage bag 300 to the bottom portion of the storage device body 100. Therefore, this storage device is capable of storing the garbage bag 300, facilitating the tearing open of the garbage bag 300, sealing and clamping the garbage bag 300 filled with pet excrement to prevent odor emission, and making it easy to carry, ultimately enhancing the user's experience.

Furthermore, referring to FIG. 5, the bottom portion of the storage device body 100 is provided with a groove 151 and a locking rib 153, a first end of the groove 151 is provided with a rotating hole 152, the first end of the sealing clip 200 is provided with a rotating portion 210, and the second end of the sealing clip 200 is provided with a buckle portion 220. The shape of the sealing clip 200 matches the shape of the groove 151. The rotating portion 210 is rotatably connected to the rotating hole 152. The buckle portion 220 is buckling connected to the locking rib 153. The rotating portion 210 may be a structure such as a rotating shaft or a rotating boss. When in use, the buckle portion 220 is separated from the locking rib 153, the opening of the garbage bag 300 is placed at the groove 151, and the sealing clip 200 is rotated to fit into the groove 151. The buckle portion 220 is then securely clasped onto the locking rib 153. Through the cooperation of the sealing clip 200 and the groove 151, the sealing and clamping of the garbage bag 300 are achieved. Furthermore, referring to FIGS. 1 and 3, the second end of the sealing clip 200 is provided with a second pressing portion 230, and the second pressing portion 230 is capable of undergoing elastic deformation when pressed, so that the buckle portion 220 is detached from the locking rib 153, thereby facilitating the unsealing of the sealing clip 200, the removal of the garbage bag 300, and disposing the garbage bag 300 into the garbage bin. The surface of the second pressing portion 230 may also be provided with anti-slip textures or anti-slip protrusions to facilitate the user to press the second pressing portion 230 smoothly.

It should be noted that, in the description of the present disclosure, any references to orientation, such as "up", "down", "front", "back", "left", "right", etc., are based on the orientation or positional relationships depicted in the accompanying drawings. These references are solely for the convenience of describing the present disclosure and simplifying the description. They do not indicate or imply that the device or element referred must have a specific orientation, be constructed or operated in a particular orientation, and should not be construed as a limitation of the present disclosure.

In the description of the present disclosure, "a plurality of" shall refer to one or more, "multiple" shall refer to two or more, and expressions such as "greater than," "less than," "exceed," etc., shall be understood as excluding the stated number. Expressions such as "above," "below," "within," etc., shall be understood as including the stated number. If references to "first" or "second" are made, they are merely for the purpose of distinguishing technical features, and should not be understood to indicate or imply relative importance, or implicitly specify the number of technical features being referred to, or imply any order of precedence among the technical features.

In the description of the present disclosure, unless otherwise explicitly limited, words such as "provided with", "install", and "connect" should be understood in a broad sense. Those skilled in the art can reasonably determine the specific meaning of the above words in the present disclosure in combination with the specific content of the technical solution.

The above-mentioned embodiments are only preferred embodiments of the present disclosure and cannot be used to limit the scope of protection of the present disclosure. Any non-substantive changes and substitutions made by those skilled in the art on the basis of the present disclosure shall belong to the scope of protection claimed by the present disclosure.

What is claimed is:

1. A garbage bag storage device that facilitates tearing open a garbage bag, comprising a storage device body; wherein a storage cavity is arranged in the storage device body, and the storage cavity is used for storing a garbage bag;

a side opening is arranged on a side portion of the storage device body, and the side opening is used for extracting the garbage bag; and a first pressing portion is further arranged on the side portion of the storage device body, and when the first pressing portion is pressed, it is capable of moving the side portion of the storage device body inward to compress the garbage bag; wherein a bottom portion of the storage device body is provided with a sealing structure, and the sealing structure is used for sealing the garbage bag and clamping the garbage bag to the bottom portion of the storage device body; wherein the sealing structure comprises a sealing clip, a first end of the sealing clip is rotatably connected to the storage device body, a second end of the sealing clip is detachably connected to the storage device body, and the sealing clip is capable of sealing the garbage bag and clamping the garbage bag to the bottom portion of the storage device body.

2. The garbage bag storage device according to claim 1, wherein the storage device body comprises a first side wall and a second side wall; the first side wall and the second side wall are connected to each other, and a gap is arranged between the first side wall and the second side wall to form the side opening.

3. The garbage bag storage device according to claim 2, wherein the first pressing portion is arranged on the first side wall, and an opening groove is arranged between a top portion of the first side wall and a top portion of the storage device body, as well as between a bottom portion of the first side wall and a bottom wall of the storage device body, to enable the first side wall to undergo elastic deformation, so that the first pressing portion is capable of pressing the garbage bag towards the second side wall.

4. The garbage bag storage device that facilitates tearing open the garbage bag according to claim 1, wherein the bottom portion of the storage device body is provided with a groove and a locking rib, a first end of the groove is provided with a rotating hole, the first end of the sealing clip is provided with a rotating portion, the second end of the sealing clip is provided with a buckle portion, the rotating portion is rotatably connected to the rotating hole, and the buckle portion is buckling connected to the locking rib.

5. The garbage bag storage device according to claim 4, wherein the second end of the sealing clip is provided with a second pressing portion, and the second pressing portion is capable of undergoing elastic deformation when pressed, so that the buckle portion is detached from the locking rib.

6. The garbage bag storage device according to claim 1, wherein a top cover is detachably connected to a top portion of the storage device body, and a top portion of the top cover is provided with a hanging portion.

7. The garbage bag storage device according to claim 1, wherein an outer surface of the first pressing portion is provided with an anti-slip structure.

8. The garbage bag storage device according to claim 1, wherein a bottom wall of the storage cavity is provided with a positioning column, and the positioning column is used for positioning and connecting a reel of the garbage bag.

* * * * *